United States Patent
Kapaan et al.

(10) Patent No.: US 7,097,184 B2
(45) Date of Patent: Aug. 29, 2006

(54) SENSOR IN KING-PIN

(75) Inventors: Hendrikus Jan Kapaan, Niewegein (NL); Johannes Adrianus Maria Duits, Bodegraven (NL); Jacobus Zwarts, Nieuwegein (NL); Klemens Schmidt, Gerbrunn (DE); Cornelius Petrus Antonius Vissers, Den Dungen (NL); Johannes Haaye Van Der Kamp, Tilburg (NL); Rico Dittmar, Schmalhalden (DE)

(73) Assignee: AB SKF, Gothenburg (SE)

( * ) Notice: Subject to any disclaimer, the term of this patent is extended or adjusted under 35 U.S.C. 154(b) by 253 days.

(21) Appl. No.: 10/480,728

(22) PCT Filed: Jun. 14, 2002

(86) PCT No.: PCT/NL02/00392

§ 371 (c)(1),
(2), (4) Date: Jun. 4, 2004

(87) PCT Pub. No.: WO02/102642

PCT Pub. Date: Dec. 27, 2002

(65) Prior Publication Data

US 2004/0207170 A1    Oct. 21, 2004

(30) Foreign Application Priority Data

Jun. 15, 2001    (NL) .................................... 1018301

(51) Int. Cl.
*B62D 7/18* (2006.01)

(52) U.S. Cl. ................................................. 280/93.512
(58) Field of Classification Search ........... 280/93.512, 280/93.5
See application file for complete search history.

(56) References Cited

U.S. PATENT DOCUMENTS

| 4,798,394 | A | * | 1/1989 | Pollock et al. | ......... 280/93.512 |
| 5,366,042 | A | * | 11/1994 | Wilks et al. | ................ 180/253 |
| 6,293,022 | B1 | * | 9/2001 | Chino et al. | ............. 33/203.18 |
| 6,568,696 | B1 | * | 5/2003 | Osborn et al. | ............. 280/93.5 |

FOREIGN PATENT DOCUMENTS

| DE | 100 46 630 | 3/2002 |
| EP | 0 330 632 | 8/1989 |
| EP | 423080 A1 * | 4/1991 |
| WO | WO 86 01467 | 3/1986 |
| WO | WO 97 26170 | 7/1997 |

* cited by examiner

*Primary Examiner*—David R. Dunn
*Assistant Examiner*—Tiffany Webb
(74) *Attorney, Agent, or Firm*—Young & Thompson

(57) ABSTRACT

King-pin assembly with a sensor (24), the King-pin assembly (5) comprising a Kingpin (12), an axle frame (10), a spindle (14) and a bearing (15) for moveably mounting the spindle (14) to the axle frame (10) using the King-pin. The King-pin assembly further comprises a spacer (1) for holding the axle frame (10) at a predetermined distance from a bearing inner ring (20). A housing (2) is attached to the spacer (1), the housing (2) comprising at least a first part (3) of the sensor (24), a second part (4) of the sensor (24) being fixedly attached to the spindle (14).

13 Claims, 2 Drawing Sheets

SENSOR IN KING-PIN

FIELD OF THE INVENTION

The present invention relates to a sensor for sensing movement or position of steered wheels of a vehicle. In particular, the present invention relates to a King-pin assembly with a sensor, the King-pin assembly comprising a King-pin, an axle frame, a spindle and a bearing for moveably mounting the King-pin in the spindle.

BACKGROUND OF THE INVENTION

Such a sensor assembly is known from European patent application EP-A-0 330 632, which describes a device for measuring the steering angle operatively associated with the articulation between one of the rotary journals of one of the steered wheels and the body of the axle. A transducer is positioned parallel to the axis of the journal and a feeler co-operates with a stationary cam member having projections at certain angular positions. Also, an embodiment is shown in which a potentiometer is positioned in an axial recess of the King-pin of the journal. The shaft of the potentiometer is coupled to a fixation point on the axle body.

These known sensor assemblies provide a number of disadvantages. The sensors are mounted predominantly externally, thus being exposed to the environment. This results in a sensor system which is not robust and susceptible to failure through many mechanisms, such as accumulating dirt. This results in an unreliable operation of the sensor.

When a sensor in the form of a potentiometer is integrated inside a cavity in the King-pin, this will affect the mechanical strength of the King-pin. Also, potentiometer sensors will always need a fixation point to the rotating part, e.g. using a shaft coupling. In certain configurations, such a fixation point is not available, e.g. when the King-pin is designed to run through all of the spindle. Potentiometers used as position sensors also often have the disadvantage that they wear out easily, especially in the middle position.

SUMMARY OF THE INVENTION

The present invention seeks to provide an improved sensor assembly for sensing movement of steered wheels of a vehicle.

According to the present invention, an improved sensor assembly is achieved by a sensor assembly according to the preamble defined above, in which the King-pin assembly further comprises a spacer for holding the axle frame at a predetermined distance from a bearing inner ring and in that a housing is attached to the spacer, the housing comprising at least a first part of the sensor, a second part of the sensor being fixedly attached to the spindle. This configuration allows for a robust design of the King-pin assembly without the disadvantages mentioned above, as the housing effectively shields the sensor components. The sensor may be any known type for sensing an angular position, e.g. using capacitive, inductive or magnetic means.

In a further embodiment, the housing comprises processing electronics connected to the first part. By integrating the processing electronics in the housing to which the first sensor part is attached, it is possible to process the sensor signals locally, without the necessity for long, noise receiving wiring. Signals from the processing electronics which are used in further vehicle systems (e.g. steer-by-wire control feedback) may be simply led from the King-pin assembly using normal wiring, as the housing is non-moving with respect to the axle body.

The first and second sensor parts may in a further embodiment be disc shaped and co-axially aligned, and may e.g. form a capacitive sensor for determining the angular position between axle frame and spindle.

In an even further embodiment, the King-pin assembly may comprise an intermediate member, e.g. a Teflon ring, positioned between the first and second parts. This allows to keep a predetermined distance between the first and second sensor parts and to provide a friction free movement A sealing member extending in a radial direction between the spacer and the spindle may be provided in a further embodiment to protect the King-pin bearing and the sensor from external contamination, such as water or dirt ingress.

In an advantageous embodiment, the spacer, housing and first part form a single assembly. This allows easy assembly of the King-pin assembly and also easy accessibility for maintenance of e.g. the King-pin bearing.

The sensor may comprise an angular position sensor, a relative motion sensor, a load sensor, and/or a temperature sensor. This allows further, more complex functions to be performed using the present King-pin sensor assembly.

BRIEF DESCRIPTION OF THE DRAWINGS

The present invention will now be explained in further detail using an exemplary embodiment, with reference to the accompanying drawing, in which.

DETAILED DESCRIPTION OF THE INVENTION

Figure 1:
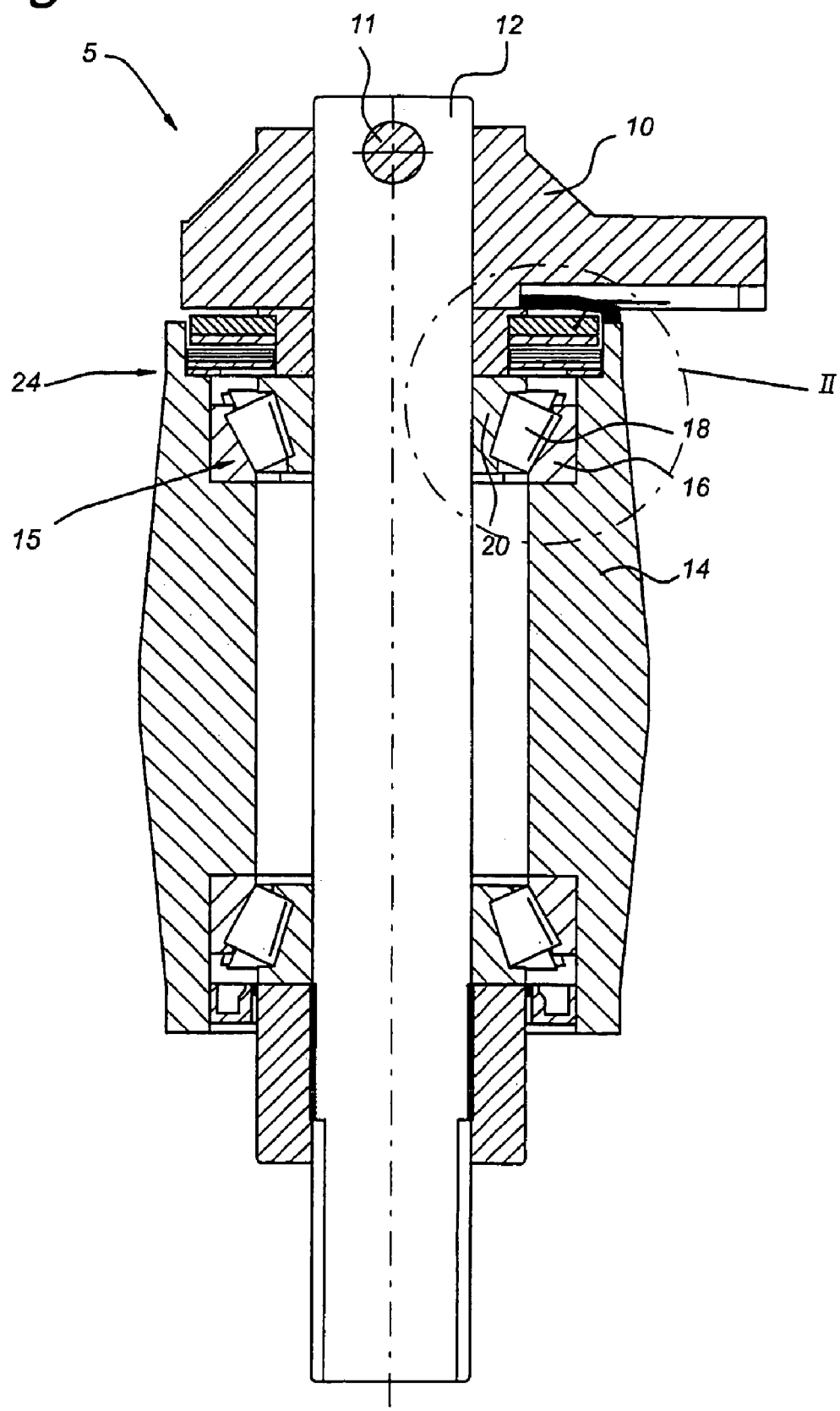
FIG. 1 shows a sectional side view of a King-pin assembly with the integrated sensor.

The present invention may be used with advantage in, e.g., a counterbalance fork lift truck, in order to sense the position or movement of the steered wheels. It may e.g. be necessary to obtain a feedback signal for a steer-by-wire arrangement. FIG. 1 shows a sectional view of part of a fork lift truck used to control the steering of the wheels, i.e. the King-pin assembly 5.

Figure 2:
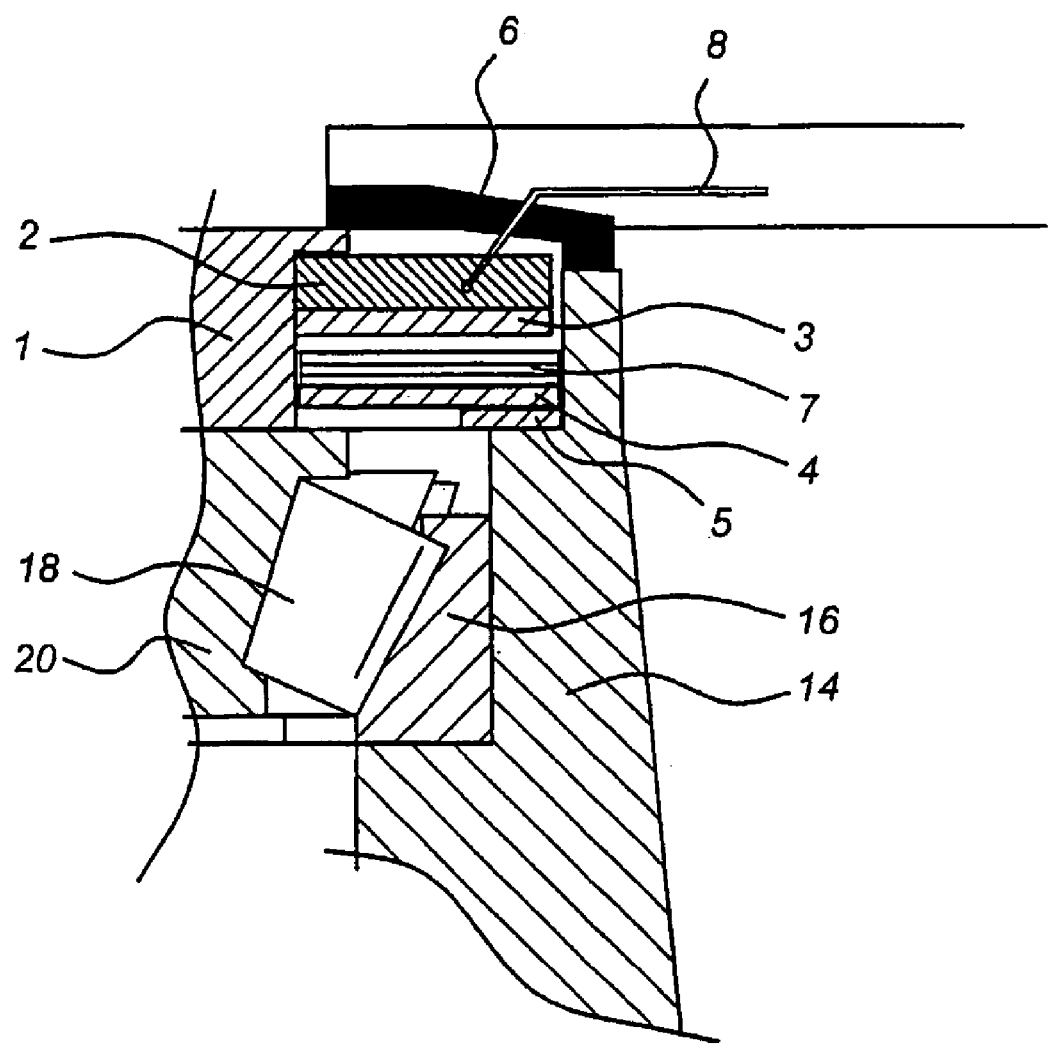
FIG. 2 shows an enlarged view of the section II of FIG. 1.

FIG. 1 shows a sectional view of the King-pin assembly 5, and FIG. 2 shows a sectional view of the part of the King-pin assembly 5 indicated by roman numeral II in FIG. 1.

The present King-pin assembly 5 may be advantageously used in a number of applications. It may be used to sense the steered wheel position of off-highway vehicles, e.g. between 0 and 180 degrees for a non-driven shaft and 0 to 50 degrees for a driven shaft. For motor vehicles, the present King-pin assembly 5 may be used to sense a position between 0 and 50 degrees, both for driven and non-driven shafts.

The King-pin 12 is fixedly attached to the frame 10 of the rear axle of the fork lift truck, e.g. using a protrusion 11. The King-pin 12 stretches downward to the steering mechanism (not shown) of one of the steered wheels of the fork lift truck. The King-pin 12 is moveably attached to a spindle 14 by means of a spindle bearing 15. The spindle bearing 15 comprises a first part 16, fixedly attached to the spindle 14, a second part 20, fixedly attached to the King-pin 12, and a number of tapered rollers 18 between the first and second part 16, 20. The spindle 14 is further attached to the steered wheel, such that in FIG. 1, the axle frame 10, King-pin 12 and second part 20 of the bearing are stationary, and the first part 16 of the bearing and the spindle 14 are moving around the spindle axis.

The spindle 14 is kept at a predefined distance from the frame 10 using a spacer 1. The spacer has a ring shape and fits around the King-pin 12, and at its outer circumference a cylinder shaped housing 2 is attached. A first sensor part 3, preferably disc shaped and flush with the underside of the housing 2, is attached to or in the housing 2. A second sensor part 4 is fixedly attached to the spindle 14 in such a way that it does not rotate around the spindle axis, and thus moves relative to the first sensor part 3. This may e.g. be accomplished by using radially extending protrusions at the circumference of the second part and associates grooves in the spindle 14. The second sensor part 4 is kept at a predetermined distance from the first sensor part 3, e.g. using a resilient ring 5 co-operating with the spindle 14. In between the first and second sensor part 3, 4, an intermediate element 7 may be positioned, e.g. comprising a Teflon coating on one or both of the first and second sensor parts 3, 4. This intermediate element 7 allows a friction free mutual movement of the first and second sensor parts 3, 4 and also keeps the distance between the first and second parts 3, 4 at a fixed value.

The first and second sensor parts 3, 4, may form a sensor 24 in the form of a capacitive angular position sensor. This may be accomplished using printed circuit boards (PCB) with appropriate copper patterns on facing surfaces of the first and second parts 3, 4, known as such to the person skilled in the art. Of course, other types of contact or non-contact sensors may be used. Also, further sensors, such as a load sensor or temperature sensor may be provided.

The sensor 24 may also be based on a different measurement principle, e.g. inductive or magnetic.

The housing 2 may comprise processing electronics for the sensor 24. The processing electronics may comprise pre-processing electronics (signal shaping, analog-to-digital converters, etc.), but also active or passive processing electronics (passive or active, digital or analog filters) and interface circuitry (e.g. a RS232 or CAN-bus interface). The sensor signal may be connected to further vehicle systems using a connection cable 8. As the electronics are positioned in the non-moving housing 2, it is possible to easily lead the connection cable 8 via the frame 10.

A further advantage of the present embodiment, is that the bearing of the spindle 14 is easily accessible, by removing the spacer 1 with housing 2 and first sensor part 3 (possibly integrated as a single assembly), and second sensor part 4 after removing or disassembling the King-pin 12 and frame 10 assembly. This way, it is possible to replace the part which is vulnerable to wear (the bearing) and re-use the other parts of the sensor, as opposed to an integrated bearing and sensor assembly.

The space between the spacer 1 and spindle 14 may be provided with a sealing member 6 to prevent contamination from entering the sensor and bearing space of the King-pin assembly. By having the sensor 24 integrated inside the Kin-pin assembly 5 (being encapsulated by a steel or plastic sealing member 6), protected from external influences and contamination, a very robust and trustworthy sensor assembly is provided. Furthermore, it is fairly simple to include the sensor 24 in the assembly process of the King-pin assembly.

Although explained particularly for a steering arrangement of a fork lift truck, the present invention may be applied to various other applications, where it is important to have a reliable and robust sensing of relative motion, especially in harsh environments. Other applications may be, but are not limited to personal vehicles (sensor integrated in strut bearing), various moving parts in heavy equipment, such as shovels, loading platforms, etc. Also, the present assembly may be applied on rotation points of the rod mechanism on the out going rod of hydraulic cylinders.

The invention claimed is:

1. King-pin assembly with a sensor (24), the King-pin assembly (5) comprising a King-pin (12), an axle frame (10), a spindle (14) and a bearing (15) for moveably mounting the spindle (14) to the axle frame (10) using the King-pin, characterised in that the King-pin assembly further comprises a spacer (1) for holding the axle frame (10) at a predetermined distance from a bearing inner ring (20) and wherein a housing (2) is attached to the spacer (1), the housing (2) comprising at least a first part (3) of the sensor (24), a second part (4) of the sensor (24) being fixedly attached to the spindle (14).

2. King-pin assembly according to claim 1, in which the housing (2) comprises processing electronics connected to the first part (3).

3. King-pin assembly according to claim 2, in which the first and second sensor parts (3, 4) are disc shaped and coaxially aligned.

4. King-pin assembly according to claim 2, further comprising a sealing member (6) extending in a radial direction between the spacer (1) and the spindle (14).

5. King-pin assembly according to claim 1, in which the first and second sensor parts (3, 4) are disc shaped and coaxially aligned.

6. King-pin assembly according to claim 5, in which the first and second parts (3, 4) form a capacitive sensor (24) for determining the angular position between axle frame (10) and spindle (14).

7. King-pin assembly according to claim 6, further comprising a sealing member (6) extending in a radial direction between the spacer (1) and the spindle (14).

8. King-pin assembly according to claim 5, further comprising a sealing member (6) extending in a radial direction between the spacer (1) and the spindle (14).

9. King-pin assembly according to claim 1, further comprising an intermediate member (7), positioned between the first and second parts (3, 4).

10. King-pin assembly according to claim 9, further comprising a sealing member (6) extending in a radial direction between the spacer (1) and the spindle (14).

11. King-pin assembly according to claim 1, further comprising a sealing member (6) extending in a radial direction between the spacer (1) and the spindle (14).

12. King-pin assembly according to claim 1, in which the spacer (1), housing (2) and first part (3) form a single assembly.

13. King-pin assembly according to claim 1, in which the sensor (24) comprises an angular position sensor, a relative motion sensor, a load sensor, and/or a temperature sensor.

* * * * *